United States Patent
Li et al.

(10) Patent No.: US 8,416,682 B2
(45) Date of Patent: Apr. 9, 2013

(54) METHOD AND IMPLEMENTING APPARATUS FOR COOPERATIVE MULTI-HOP ROUTING IN WIRELESS NETWORK

(75) Inventors: Yun Li, Shenzhen (CN); Hongcheng Zhuang, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/472,779

(22) Filed: May 16, 2012

(65) Prior Publication Data
US 2012/0230255 A1 Sep. 13, 2012

Related U.S. Application Data

(63) Continuation of application No. PCT/CN2011/071197, filed on Feb. 23, 2011.

(30) Foreign Application Priority Data

May 12, 2010 (CN) .......................... 2010 1 0176128

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/218; 370/217; 370/221; 370/231; 370/328; 370/331

(58) Field of Classification Search .................. 370/217, 370/221, 218, 231, 328, 331
See application file for complete search history.

(56) References Cited

U.S. PATENT DOCUMENTS

| 2005/0013286 A1 | 1/2005 | Holland et al. |
| 2005/0113084 A1 | 5/2005 | Scaglione et al. |

(Continued)

FOREIGN PATENT DOCUMENTS

| CN | 101166073 | 4/2008 |
| CN | 101243655 | 8/2008 |

OTHER PUBLICATIONS

"A novel successive relaying protocol based on superposition coding"; Zhang et al.; published in 2010 12th IEEE International Conference on Communication Technology (ICCT), Nov. 11-14, 2010 (date of conference); pp. 1043-1046; ISBN: 978-1-4244-6868-3.*

(Continued)

*Primary Examiner* — Michael Thier
*Assistant Examiner* — Benjamin H Elliott, IV
(74) *Attorney, Agent, or Firm* — Staas & Halsey LLP

(57) ABSTRACT

The present invention relates to a method and an implementing apparatus for cooperative multi-hop routing in a wireless network. According to the method the diversity gains and the interrupt probabilities in a cooperative communication manner between master nodes in the route are obtained, and the segmenting mode for sending packet data is determined accordingly, thus implementing cooperative communication in a multi-hop route, where signals having same information are sent through different paths, and multiple independently faded copies of data symbols may be obtained at a receiver end, thus obtaining higher reception reliability and higher transmission capacity, and improving performance of a communication process.

14 Claims, 5 Drawing Sheets

U.S. PATENT DOCUMENTS

| | | | |
|---|---|---|---|
| 2006/0039385 | A1 | 2/2006 | Bare et al. |
| 2007/0041345 | A1* | 2/2007 | Yarvis et al. ............ 370/331 |
| 2007/0061445 | A1 | 3/2007 | Deganaro et al. |
| 2008/0075007 | A1* | 3/2008 | Mehta et al. ............ 370/238 |
| 2008/0080440 | A1 | 4/2008 | Yarvis et al. |
| 2008/0144562 | A1 | 6/2008 | Draper et al. |
| 2008/0198789 | A1 | 8/2008 | Brown et al. |
| 2008/0225774 | A1 | 9/2008 | Kim et al. |
| 2008/0263223 | A1 | 10/2008 | Degenaro et al. |
| 2009/0103472 | A1 | 4/2009 | Ni et al. |

OTHER PUBLICATIONS

"Cooperative relay selection strategies in two-hop IEEE 802.16 relay networks"; Liu et al.; published in 2010 2nd International Conference on Future Computer and Communication (ICFCC), May 21-24, 2010 (date of conference); pp. V2-504-V2-508; ISBN: 978-1-4244-5821-9.*

Partial translation of ISR Written Opinion mailed May 26, 2011 in corresponding International Patent Application No. PCT/CN2011/071197 (1 page).

J. Nicholas Laneman et al., "Cooperative Diversity in Wireless Networks: Efficient Protocols and Outage Behavior", IEEE Transactions on Information Theory, vol. 50, No. 12, Dec. 2004, pp. 3062-3080.

Partick Herhold et al., "Cooperative multi-hop transmission in wireless networks", Computer Networks, vol. 49, 2005, pp. 299-324.

Yong Yuan et al., "A Novel Cluster-Based Cooperative MIMO Scheme for Multi-Hop Wireless Sensor Networks", EURASIP Journal on Wireless Communications and Networking, vol. 2006, 2006, pp. 1-9.

Aitor del Coso et al., "Cooperative Distributed MIMO Channels in Wireless Sensor Networks", IEEE Journal on Selected Areas in Communications, vol. 25, No. 2, Feb. 2007, pp. 402-414.

Elzbieta Beres et al., "Cooperation and Routing in Multi-Hop Networks", Proceedings of the ICC 2007, 2007, pp. 4767-4772.

Helmut Adam et al., "Multi-Hop-Aware Cooperative Relaying", Vehicular Technology Conference, 2009, pp. 1-5.

Yun Li et al., "Segment cooperation communication in multi-hop wireless networks", Wireless Networks, Jun. 2012, pp. 1-10.

Extended European Search Report dated Aug. 27, 2012 issued in corresponding European Patent Application No. 11780071.4.

International Search Report mailed May 26, 2011 in corresponding International Patent Application No. PCT/CN2011/071197.

* cited by examiner

METHOD AND IMPLEMENTING APPARATUS FOR COOPERATIVE MULTI-HOP ROUTING IN WIRELESS NETWORK

CROSS-REFERENCE TO RELATED APPLICATIONS

This application is a continuation of International Application No. PCT/CN2011/071197, filed on Feb. 23, 2011, which claims priority to Chinese Patent Application No. 201010176128.5, filed on May 12, 2010, both of which are hereby incorporated by reference in their entireties.

FIELD OF THE INVENTION

The present invention relates to the field of wireless communication technologies, and in particular, to a method and an implementing apparatus for cooperative multi-hop routing in a wireless network.

BACKGROUND OF THE INVENTION

In a wireless network, in the case where a source node and a destination node are connected by a one-hop direct link, cooperative communication (Cooperative Communication, CC) is usually adopted to improve the reliability of communication. As a communication manner, cooperative communication may enable a single-antenna mobile station to obtain a gain which is similar to that in a multiple input multiple output (Multiple-Input Multiple-Output, MIMO) system.

A basic idea of cooperative communication is as follows: In a multi-user environment, single-antenna mobile stations may share their antennas according to a certain manner to generate a virtual MIMO system and obtain a transmit diversity gain. Cooperative communication makes use of an antenna of another idle node in the wireless network. When the source node sends information to the destination node, the information is also sent to the idle node at the same time, and then the idle node forwards the information to the destination node. Thus, a node utilizes not only its own spatial channel but also a spatial channel of the idle node, so that a cooperative diversity is generated for the communication, and a virtual MIMO system is generated, which may effectively increase system capacity, enhance network quality, and improves system performance. Cooperative communication methods include a decode-and-forward mode, an amplify-and-forward mode, and a coding-and-forward mode.

In the decode-and-forward (Decode-and-Forward, DF) mode, a cooperative node first attempts to detect data bits of the source node, and then resends the detected bits.

In the amplify-and-forward (Amplify-and-Forward, AF) mode, a cooperative node receives a signal with noise, where the signal with noise is sent by the source node, then amplifies the signal, and resends the amplified signal with noise. A base station makes a combined decision on data transferred by a user and its partner.

The coding-and-forward (Coding-and-Forward, CF) mode is a combination of a channel coding idea and cooperation. In the coding-and-forward mode, two independent fading channels are used to send different parts of each user codeword. A basic idea is that every user sends additional redundant information to its partner. When a channel between them is very bad, this mechanism is automatically restored to a non-cooperation mode. An outstanding characteristic of this mechanism is that cooperation is implemented through channel coding design without the need of feedback between users.

In practical applications, for a decentralized control network, cooperative communication adopts a distributed cooperation protocol, where a user node may independently decide at any time which user to cooperate with, and every user node has at least one partner to provide a second path, so as to form a diversity.

During the process of implementing the present invention, the inventor discovers that the prior art has at least the following disadvantage: The cooperative communication adopting the distributed cooperation protocol is only applicable to the case where there is only a one-hop direct link between the source node and the destination node, and for the case where there is multi-path multi-hop routing between the source node and the destination node, no corresponding cooperative communication method is available to improve performance of a communication process.

SUMMARY OF THE INVENTION

Embodiments of the present invention provide a method and an implementing apparatus for cooperative multi-hop routing in a wireless network, so as to improve communication performance of multi-hop routing.

An embodiment of the present invention provides a method for cooperative multi-hop routing in a wireless network, where the method includes:

after a route is set up, using a common neighbor node of a first master node and a second master node that are in the route as a cooperative node, and obtaining an end-to-end diversity gain and an interrupt probability between the first master node and the second master node when the cooperative node is in cooperation;

using a common neighbor node of the second master node and a third master node that are in the route as a cooperative node, and obtaining an end-to-end diversity gain and an interrupt probability between the second master node and the third master node when the cooperative node is in cooperation;

using a common neighbor node of the first master node and the third master node that are in the route as a cooperative node, and obtaining an end-to-end diversity gain and an interrupt probability between the first master node and the third master node when the cooperative node is in cooperation; and determining a segmenting mode as one-hop segmenting with a corresponding cooperative node or two-hop segmenting with a corresponding cooperative node by using the obtained diversity gains and interrupt probabilities.

An embodiment of the present invention also provides an apparatus for implementing cooperative multi-hop routing in a wireless network, where the apparatus includes:

a first one-hop segmenting unit, configured to, after a route is set up, use a common neighbor node of a first master node and a second master node that are in the route as a cooperative node, and obtain an end-to-end diversity gain and an interrupt probability between the first master node and the second master node when the cooperative node is in cooperation;

a second one-hop segmenting unit, configured to use a common neighbor node of the second master node and a third master node that are in the route as a cooperative node, and obtain an end-to-end diversity gain and an interrupt probability between the second master node and the third master node when the cooperative node is in cooperation;

a two-hop segmenting unit, configured to use a common neighbor node of the first master node and the third master node that are in the route as a cooperative node, and obtain an end-to-end diversity gain and an interrupt probability between the first master node and the third master node when the cooperative node is in cooperation; and a mode determining unit, configured to determine a segmenting mode as one-hop segmenting with a corresponding cooperative node or two-hop segmenting with a corresponding cooperative node by using the obtained diversity gains and interrupt probabilities.

According to the technical solutions provided in the foregoing embodiments, the diversity gains and the interrupt probabilities in a cooperative communication manner between master nodes in the route are obtained, and the segmenting mode for sending packet data is determined accordingly, thus implementing cooperative communication in a multi-hop route, where signals having same information are sent through different paths, and multiple independently faded copies of data symbols may be obtained at a receiver end, thus obtaining higher reception reliability and higher transmission capacity, and improving performance of a communication process.

BRIEF DESCRIPTION OF THE DRAWINGS

To better explain the technical solutions of the embodiments of the present invention, accompanying drawings required in the description of the embodiments are briefly introduced below. Apparently, the accompanying drawings in the following description are only some embodiments of the present invention, and persons of ordinary skill in the art may further obtain other drawings according to these accompanying drawings without creative efforts.

DETAILED DESCRIPTION OF THE EMBODIMENTS

The technical solutions of the embodiments of the present invention are described clearly and completely below with reference to the accompanying drawings in the embodiments of the present invention. Obviously, the described embodiments are only part of rather than all of the embodiments of the present invention. Based on the embodiments of the present invention, all other embodiments that persons of ordinary skill in the art obtain without creative efforts shall also fall within the scope of the present invention.

Figure 1:
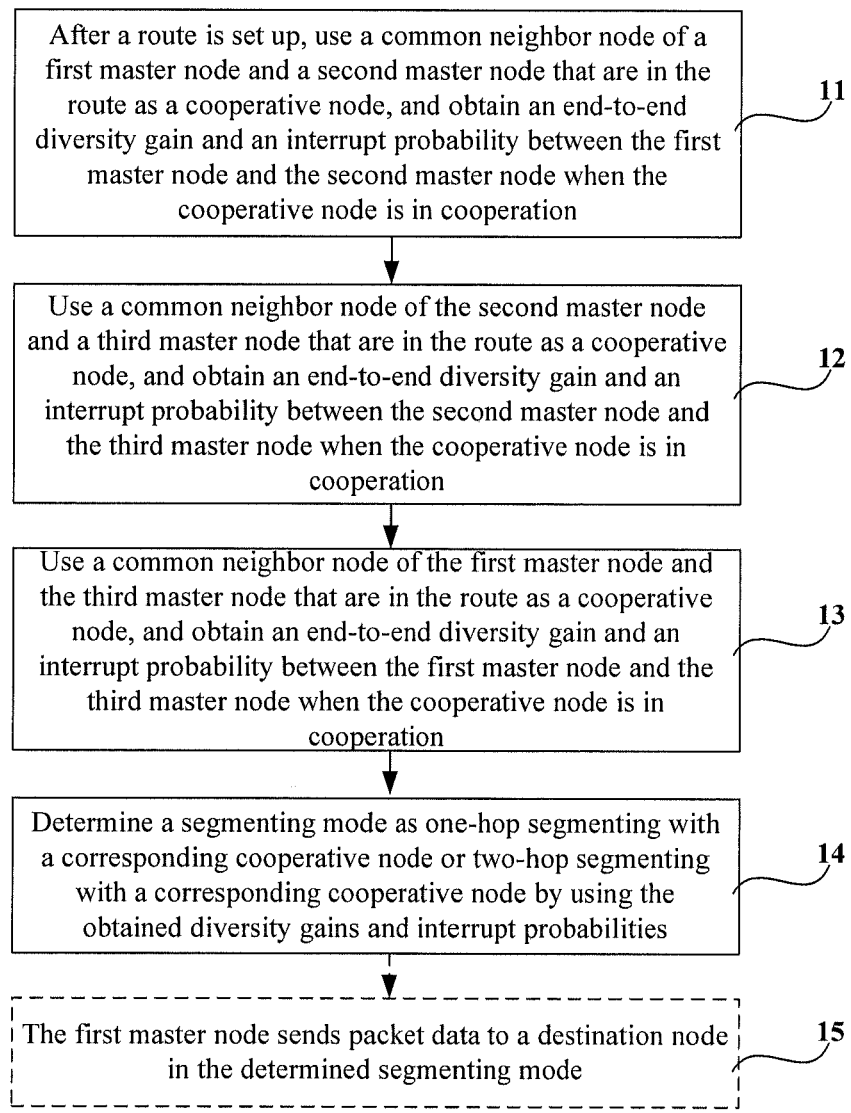
FIG. 1 is a flowchart of a method for cooperative multi-hop routing in a wireless network according to an embodiment of the present invention.

FIG. 1 is a flowchart of a method for cooperative multi-hop routing in a wireless network according to an embodiment of the present invention. As shown in FIG. 1, the method includes:

Step 11: After a route is set up, use a common neighbor node of a first master node and a second master node that are in the route as a cooperative node, and obtain an end-to-end diversity gain and an interrupt probability between the first master node and the second master node when the cooperative node is in cooperation.

The diversity gain refers to a signal gain obtained by signal combination after a signal passes through different fading channels with different fading features, relative to the signal passing through a single fading channel, that is, a degree of improvement obtained by a system by adopting receiving diversity compared with not adopting receiving diversity under a same receiving condition. A cooperative diversity relies on an antenna of the cooperative node and its own antenna to transmit two or multiple signal samples with independent spatial fading, and by using an independent fading feature of a channel, redundant information is utilized in the combination, so as to obtain a spatial diversity gain, and improve transmission performance.

Step 12: Use a common neighbor node of the second master node and a third master node that are in the route as a cooperative node, and obtain an end-to-end diversity gain and an interrupt probability between the second master node and the third master node when the cooperative node is in cooperation.

Step 13: Use a common neighbor node of the first master node and the third master node that are in the route as a cooperative node, and obtain an end-to-end diversity gain and an interrupt probability between the first master node and the third master node when the cooperative node is in cooperation.

Step 14: Determine a segmenting mode as one-hop segmenting with a corresponding cooperative node or two-hop segmenting with a corresponding cooperative node by using the obtained diversity gains and interrupt probabilities.

A cooperative node of good performance is selected and a lower interrupt probability is required to obtain a higher diversity gain. It can be obtained from a simple analysis that, in multi-path transmission, an interrupt probability of inter-node paths affects the multi-path transmission. Interruption of one path of the multiple paths results in the decrease of the number of diversities received by a destination node, and the corresponding decrease of diversity gains. The more cooperative paths exist, the lower the interrupt probability.

It should be noted that, in a multi-hop route, two adjacent hops in the route may be sequentially taken as a section by using the first master node as a starting node; a segmenting mode of each subsequent section of route is determined in turn according to the method for determining the segmenting mode from the first master node to the third master node; after the segmenting mode of each section of route is determined, it is judged whether an ending node of the section of route is the destination node of the route; and if not, a segmenting mode of a subsequent adjacent section of route is determined.

In the embodiment, the diversity gains and the interrupt probabilities in a cooperative communication manner between master nodes in the route are obtained, and the segmenting mode for sending packet data is determined accordingly, thus implementing cooperative communication in a multi-hop route, where signals having same information are sent through different paths, and multiple independently faded copies of data symbols may be obtained at a receiver end, thus obtaining higher reception reliability and higher transmission capacity, and improving performance of a communication process.

The method for cooperative multi-hop routing in a wireless network according to the embodiment may further include:

Step 15: The first master node sends packet data to the destination node in the determined segmenting mode. That is, cooperative communication is adopted in the multi-hop route to obtain an increase of a diversity gain and a decrease of an interrupt probability.

Figure 2:
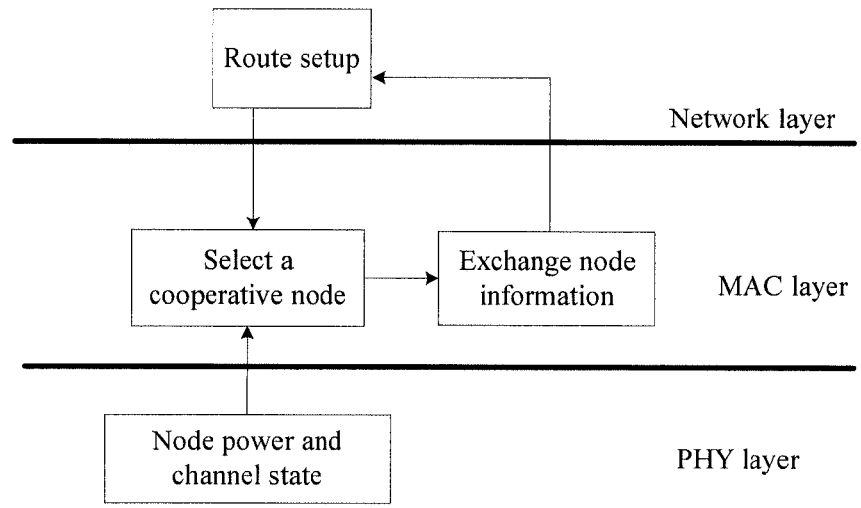
FIG. 2 is a schematic diagram of a function model of a first master node in the method for cooperative multi-hop routing in a wireless network according to an embodiment of the present invention.

The foregoing step 11 to step 15 may be executed by the first master node. A function model of the first master node may be as shown in FIG. 2, where route setup is implemented by a source node at the network layer of IP, the selection of cooperative nodes and the exchange of node information are implemented at the MAC layer of the node, the PHY layer provides the MAC layer with PHY layer information of related nodes, such as node power and channel state, as a basis for the selection of cooperative nodes at the MAC layer.

Because a route is determined after the route is set up, the first master node, namely the source node, may know subsequent master nodes that are in the rout, such as the second master node and third master node, and calculate diversity gains of one-hop segmenting and two-hop segmenting separately according to neighbor node information of the first master node, the second master node, and the third master node, so as to select a segmenting mode from the first master node to the third master node (see the following description for details), and a corresponding cooperative node. Afterwards, an operation which is the same as that of the source node is performed starting from the third master node.

One-hop segmenting means that the two master nodes of at least one hop in two adjacent hops in the route use a common neighbor node as a cooperative node; two-hop segmenting means that the first master node and the third master node of two adjacent hops in the route use at least one common neighbor node as a cooperative node.

When a one-hop direct link uses no cooperative node, the first master node is used as the source node, the second master node is used as the destination node, and a formula for calculating the diversity gain $C_{jD}$ from the first master node to the second master node is:

$$C_{jD} = W \log(1 + SNR|\alpha_{sd}|^2);$$

where, the subscript s represents the source node, d represents the destination node, W is a channel bandwidth, and $SNR|\alpha_{sd}|^2$ is a signal-to-noise ratio from the source node to the destination node.

When a one-hop direct link uses one cooperative node, and a cooperation mode is an amplify-and-forward mode, the first master node is used as the source node, and the second master node is used as the destination node, and a formula for calculating the diversity gain $C_{jAF}$ from the first master node to the second master node is:

$$C_{jAF} = \frac{W}{2} \log(1 + SNR|\alpha_{sd}|^2 + f(SNR|\alpha_{sr}|^2, SNR|\alpha_{rd}|^2));$$

where, the subscript r represents the cooperative node, $$f(x, y) = \frac{xy}{x + y + 1},$$

$SNR|\alpha_{sr}|^2$ is a signal-to-noise ratio from the source node to the cooperative node, and $SNR|\alpha_{rd}|^2$ is a signal-to-noise ratio from the cooperative node to the destination node.

An end-to-end signal-to-noise ratio may be obtained by solving a state equation:

$$\underbrace{\begin{bmatrix} y_d[n] \\ y_d[n+N/4] \end{bmatrix}}_{y_d[n]} = \underbrace{\begin{bmatrix} \alpha_{s,d} \\ \alpha_{r,d}\beta\alpha_{s,r} \end{bmatrix}}_{A} X_s[n] + \underbrace{\begin{bmatrix} 0 & 1 & 0 \\ \alpha_{r,d}\beta & 0 & 1 \end{bmatrix}}_{B} \underbrace{\begin{bmatrix} z_r[n] \\ z_d[n] \\ z_d[n+N/4] \end{bmatrix}}_{z[n]}$$

$$AA^+ = \begin{bmatrix} \alpha_{s,d}^2 & \alpha_{s,d}(\alpha_{r,d}\beta\alpha_{s,r})^* \\ \alpha_{s,d}^*\alpha_{r,d}\beta\alpha_{s,r} & |\alpha_{r,d}\beta\alpha_{s,r}|^2 \end{bmatrix}$$

$$BE[zz^+]B^+ = \begin{bmatrix} N_d & 0 \\ 0 & |\alpha_{r,d}\beta|^2 N_r + N_d \end{bmatrix}$$

$$\det(I + (P_s AA^+)(BE[zz^+]B^+)^{-1}) = 1 + \frac{P_s \alpha_{s,d}^2}{N_d} + \frac{P_s|\alpha_{r,d}\beta\alpha_{s,r}|^2}{(|\alpha_{r,d}\beta|^2 N_r + N_d)}$$

$$= 1 + SNR|\alpha_{sd}|^2 + f(SNR|\alpha_{sr}|^2, SNR|\alpha_{rd}|^2)$$

where, $\alpha$ is a channel gain, SNR is a signal-to-noise ratio, P is transmit power, N is noise power, $\beta$ is a relay amplification coefficient, and $$\beta \leq \sqrt{\frac{P_r}{|\alpha_{sr}|^2 P_s + N_r}}.$$

When a one-hop direct link uses one cooperative node, and the cooperation mode is a decode-and-forward mode, a formula for calculating the diversity gain $C_{jDF}$ from the first master node to the second master node is:

$$C_{jDF} = \frac{W}{2} \min\{\log(1 + SNR|\alpha_{sr}|^2), \log(1 + SNR|\alpha_{sd}|^2 + SNR|\alpha_{rd}|^2)\}$$

When a one-hop direct link uses one cooperative node, and the cooperation mode is a coding-and-forward mode, the diversity gain from the first master node to the second master node equals the diversity gain $C_{jDF}$ in the decode-and-forward mode.

Similarly, when the second master node is used as the source node, and the third master node is used as the destination node, the diversity gain from the second master node to the third master node may be calculated.

When two-hop segmenting is adopted, and there is one cooperative node, a formula for calculating the diversity gain in the amplify-and-forward mode is:

$$C_{jAF} = \frac{W}{2} \log\left(1 + \frac{P_s|\alpha_{n_1 d}\beta_1 \alpha_{sn_1}|^2}{|\alpha_{n_1 d}\beta_1|^2 N_{n_1} + N_d} + \frac{P_s|\alpha_{rd}\beta_2 \alpha_{sr}|^2}{|\alpha_{rd}\beta_2|^2 N_r + N_d}\right);$$

where, a process of using a state equation to solve $$1 + \frac{P_s|\alpha_{n_1 d}\beta_1 \alpha_{sn_1}|^2}{|\alpha_{n_1 d}\beta_1|^2 N_{n_1} + N_d} + \frac{P_s|\alpha_{rd}\beta_2 \alpha_{sr}|^2}{|\alpha_{rd}\beta_2|^2 N_r + N_d}$$

is:

$$\underbrace{\begin{bmatrix} y_d[n] \\ y_d[n+N/4] \end{bmatrix}}_{y_d[n]} =$$

-continued $$\underbrace{\begin{bmatrix} \alpha_{n_1,d}\beta_1\alpha_{s,n_1} \\ \alpha_{r,d}\beta_2\alpha_{s,r} \end{bmatrix}}_{A} X_s[n] + \underbrace{\begin{bmatrix} \alpha_{n_1,d}\beta_1 & 0 & 1 & 0 \\ 0 & \alpha_{r,d}\beta_2 & 0 & 1 \end{bmatrix}}_{B} \underbrace{\begin{bmatrix} z_{n_1}[n] \\ z_r[n+N/4] \\ z_d[n] \\ z_d[n+N/4] \end{bmatrix}}_{z[n]}$$

$$AA^+ = \begin{bmatrix} |\alpha_{n_1,d}\beta_1\alpha_{s,n_1}|^2 & \alpha_{n_1,d}\beta_1\alpha_{s,n_1}(\alpha_{r,d}\beta_2\alpha_{s,r})^* \\ (\alpha_{n_1,d}\beta_1\alpha_{s,n_1})^*\alpha_{r,d}\beta_2\alpha_{s,r} & |\alpha_{r,d}\beta_2\alpha_{s,r}|^2 \end{bmatrix}$$

$$BE[zz^+]B^+ = \begin{bmatrix} |\alpha_{n_1,d}\beta_1|^2 N_{n_1} + N_d & 0 \\ 0 & |\alpha_{r,d}\beta_2|^2 N_r + N_d \end{bmatrix}$$

$$\det(I + (P_s A A^+)(BE[zz^+]B^+)^{-1}) =$$

$$1 + \frac{P_s|\alpha_{n_1,d}\beta_1\alpha_{s,n_1}|^2}{(|\alpha_{n_1,d}\beta_1|^2 N_{n_1} + N_d)} + \frac{P_s|\alpha_{r,d}\beta_2\alpha_{s,r}|^2}{(|\alpha_{r,d}\beta_2|^2 N_r + N_d)}.$$

A formula for calculating the diversity gain $C_{jDF}$ in the decode-and-forward mode is:

$$C_{jDF} = \frac{W}{2}\min\{\log(1 + SNR|\alpha_{sn_1}|^2 + SNR|\alpha_{sr}|^2), \log(1 + SNR|\alpha_{n_1 d}|^2 + SNR|\alpha_{rd}|^2)\}.$$

When two-hop segmenting is adopted, and there are two cooperative nodes, a formula for calculating the diversity gain in the amplify-and-forward mode is:

$$C_{jAF} = \frac{W}{3}$$
$$\log\left(1 + \frac{P_s|a_{n_1 d}\beta_1 a_{sn_1}|^2}{|a_{n_1 d}\beta_1|^2 N_{n_1} + N_d} + \frac{P_s|a_{r_1 d}\beta_2 a_{sr_1}|^2}{|a_{r_1 d}\beta_2|^2 N_{r_1} + N_d} + \frac{P_s|a_{r_2 d}\beta_3 a_{sr_2}|^2}{|a_{r_2 d}\beta_3|^2 N_{r_2} + N_d}\right);$$

where, a process of using a state equation to solve $$1 + \frac{P_s|\alpha_{n_1,d}\beta_1\alpha_{sn_1}|^2}{|\alpha_{n_1,d}\beta_1|^2 N_{n_1} + N_d} + \frac{P_s|\alpha_{r_1,d}\beta_2\alpha_{sr_1}|^2}{|\alpha_{r_1,d}\beta_2|^2 N_{r_1} + N_d} + \frac{P_s|\alpha_{r_2,d}\beta_3\alpha_{sr}|^2}{|\alpha_{r_2,d}\beta_3|^2 N_{r_2} + N_d}$$

is:

$$\underbrace{\begin{bmatrix} y_d[n] \\ y_d[n+N/6] \\ y_d[n+N/3] \end{bmatrix}}_{y_d[n]} = \underbrace{\begin{bmatrix} \alpha_{n_1,d}\beta_1\alpha_{s,n_1} \\ \alpha_{r_1,d}\beta_2\alpha_{s,r_1} \\ \alpha_{r_2,d}\beta_3\alpha_{s,r_2} \end{bmatrix}}_{A} X_s[n] + \underbrace{\begin{bmatrix} \alpha_{n_1,d}\beta_1 & 0 & 0 & 1 & 0 & 0 \\ 0 & \alpha_{r_1,d}\beta_2 & 0 & 0 & 1 & 0 \\ 0 & 0 & \alpha_{r_2,d}\beta_3 & 0 & 0 & 1 \end{bmatrix}}_{B} \underbrace{\begin{bmatrix} z_{n_1}[n] \\ z_{r_1}[n+N/6] \\ z_{r_2}[n+N/3] \\ z_d[n] \\ z_d[n+N/6] \\ z_d[n+N/3] \end{bmatrix}}_{z[n]}$$

$$AA^+ = \begin{bmatrix} |\alpha_{n_1,d}\beta_1\alpha_{s,n_1}|^2 & \alpha_{n_1,d}\beta_1\alpha_{s,n_1}(\alpha_{r_1,d}\beta_2\alpha_{s,r_1})^* & \alpha_{n_1,d}\beta_1\alpha_{s,n_1}(\alpha_{r_2,d}\beta_3\alpha_{s,r_2})^* \\ (\alpha_{n_1,d}\beta_1\alpha_{s,n_1})^*\alpha_{r_1,d}\beta_2\alpha_{s,r_1} & |\alpha_{r_1,d}\beta_2\alpha_{s,r_1}|^2 & \alpha_{r_1,d}\beta_2\alpha_{s,r_1}(\alpha_{r_2,d}\beta_3\alpha_{s,r_2})^* \\ (\alpha_{n_1,d}\beta_1\alpha_{s,n_1})^*\alpha_{r_2,d}\beta_3\alpha_{s,r_2} & (\alpha_{r_1,d}\beta_2\alpha_{s,r_1})^*\alpha_{r_2,d}\beta_3\alpha_{s,r_2} & |\alpha_{r_2,d}\beta_3\alpha_{s,r_2}|^2 \end{bmatrix}$$

$$BE[zz^+]B^+ = \begin{bmatrix} |\alpha_{n_1,d}\beta_1|^2 N_{n_1} + N_d & 0 & 0 \\ 0 & |\alpha_{r_1,d}\beta_2|^2 N_{r_1} + N_d & 0 \\ 0 & 0 & |\alpha_{r_2,d}\beta_3|^2 N_{r_2} + N_d \end{bmatrix}$$

$$\det(I + (P_s A A^+)(BE[zz^+]B^+)^{-1}) =$$

$$1 + \frac{P_s|\alpha_{n_1,d}\beta_1\alpha_{s,n_1}|^2}{(|\alpha_{n_1,d}\beta_1|^2 N_{n_1} + N_d)} + \frac{P_s|\alpha_{r_1,d}\beta_2\alpha_{s,r_1}|^2}{(|\alpha_{r_1,d}\beta_2|^2 N_{r_1} + N_d)} + \frac{P_s|\alpha_{r_2,d}\beta_3\alpha_{s,r_2}|^2}{(|\alpha_{r_2,d}\beta_3|^2 N_{r_2} + N_d)};$$

A formula for calculating the diversity gain $C_{jDF}$ in the decode-and-forward mode is:

$$C_{jDF} = \frac{W}{3}\min\{\log(1 + SNR|\alpha_{sn_1}|^2 + SNR|\alpha_{sr_1}|^2 + SNR|\alpha_{sr_2}|^2),$$
$$\log(1 + SNR|\alpha_{n_1 d}|^2 + SNR|\alpha_{r_1 d}|^2 + SNR|\alpha_{r_2 d}|^2)\}.$$

The interrupt probability between the first master node and the second master node is calculated in the same way as that of the interrupt probability of a one-hop direct link in the prior art. When the first master node is used as the source node, and the second master node is used as the destination node, a formula for calculating the interrupt probability $p_{jD}$ in the non-cooperation mode is:

$$p_{jD}(SNR, R) = \Pr[C_{jD} < 2r]$$

$$= \Pr\left[|\alpha_{sd}|^2 < \frac{2^R - 1}{SNR}\right]$$

$$= 1 - \exp\left(-\frac{2^R - 1}{SNR\sigma_{sd}^2}\right) \sim \frac{1}{\sigma_{sd}^2} \cdot \frac{2^R - 1}{SNR};$$

This formula is used to describe an attenuation rate at a certain signal-to-noise ratio and transmission rate under the Rayleigh fading channel, where R=2r/W b/s/Hz.

When there is one cooperative node between the first master node and the second master node, the interrupt probability in the amplify-and-forward mode equals the interrupt probability in the decode-and-forward mode. The calculation formula is:

$$p_{jAF/DF} = (-(1-p_{sr})(1-p_{rd}))p_{sd}$$

$$= \left[1 - \exp\left(-\frac{2^{R_{sr}}-1}{SNR\sigma_{sr}^2} - \frac{2^{R_{rd}}-1}{SNR\sigma_{rd}^2}\right)\right]\left[1 - \exp\left(-\frac{2^{R_{sd}}-1}{SNR\sigma_{sd}^2}\right)\right];$$

where, and $R_{sr}=2r_{sr}/W$, $R_{rd}=2r_{rd}/W$, and $R_{sd}=2r_{sd}/W$, where $r_{sr}$, $r_{rd}$, and $r_{sd}$ respectively represent data rates required to be sent between the source node and the cooperative node, between the cooperative node and the destination node, and between the source node and the destination node.

For the amplify-and-forward mode and the coding-and-forward mode, signal-to-noise ratios and sending rates of a direct channel and a forward channel are independent. In the calculation of the interrupt probability, the forward channel may be considered as a set of direct channels.

Similarly, when the second master node is used as the source node, and the third master node is used as the destination node, the interrupt probability from the second master node to the third master node may be calculated.

The interrupt probability of two-hop segmenting is obtained from the interrupt probability between the first master node and the second master node and the interrupt probability between the second master node and the third master node. For details the following description about FIG. 4.

Before the cooperative node is selected, the signal-to-noise ratio of the channel should be obtained first. It can be obtained from the foregoing formulas that, the higher the signal-to-noise ratio, the higher the diversity gain. According to the Shannon formula, a channel of a higher signal-to-noise ratio has a higher throughput under a given bandwidth. For the impact on the interrupt probability, the higher the signal-to-noise ratio, the smaller the probability of falling on an average value. That is, the distribution of the interrupt probability is more even. At the same time, a sending rate of the channel also has effects on the performance of cooperation. The impact of these factors on the transmission performance needs to be considered comprehensively as a criterion for assessing whether the node can be used as a cooperative node.

The embodiment of the present invention stresses determining the segmenting manner and the cooperative node, that is, determining the segmenting mode. The segmenting mode refers to a unit that is formed by the three master nodes of two adjacent hops in the route and an adopted cooperative node. When it is determined that the two adjacent hops in the route are one-hop segmenting or two-hop segmenting, and the cooperative node is determined, the segmenting mode is determined.

The process of determining the segmenting mode is a process of analyzing impacts of a communication path and the number of hops on the performance of the communication process. It is found that the increase of paths and the decrease of the number of hops both have good effects on the performance of the communication process, but when the paths are increased, the number of hops is increased definitely at the same time, which is not good for the improvement of the performance of the communication process. Therefore, the process of determining the segmenting mode is a process of finding a best balance between the paths and the number of hops, where a multi-hop route is divided into several segments (segment), the number of hops of which is two hops at most, and the segments are used as smallest units of the multi-hop route. Each segment adopts a cooperative communication technology, and an interrupt probability and a path diversity gain from the source node to the destination node are optimized through the use of cooperative paths, that is, the increase of the diversity gain and the decrease of the interrupt probability in the communication process are achieved.

Figure 3:
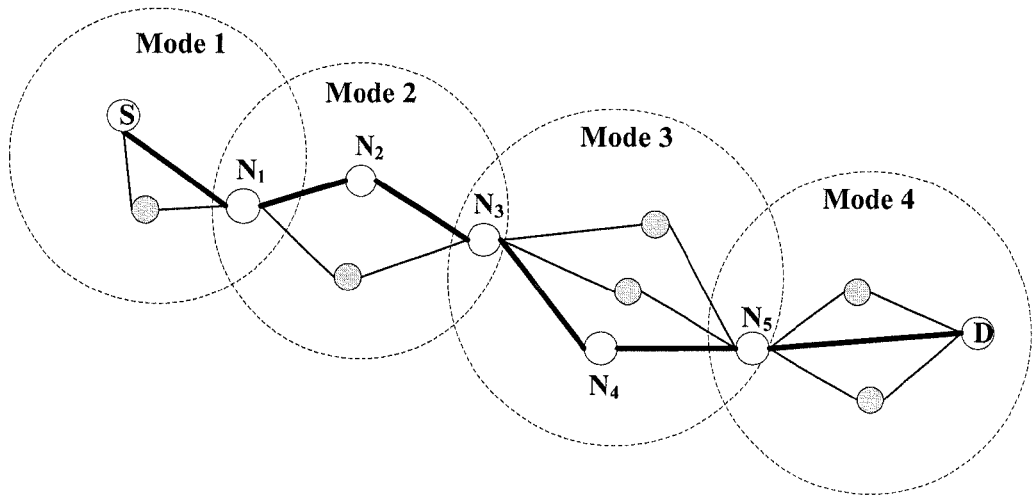
FIG. 3 is a schematic diagram of a segmenting mode in the method for cooperative multi-hop routing in a wireless network according to an embodiment of the present invention.

As shown in FIG. 3, an established route $S \rightarrow N_1 \rightarrow N_2 \rightarrow N_3 \rightarrow N_4 \rightarrow N_5 \rightarrow D$ is divided to four segments, where a segmenting mode of each segment is different. For example, a mode 1 is a segmenting mode of one-hop segmenting with one cooperative node; a mode 2 is a segmenting mode of two-hop segmenting with one cooperative node; a mode 3 is a segmenting mode of two-hop segmenting with two cooperative nodes; and a mode 4 is a segmenting mode of one-hop segmenting with two cooperative nodes. The numbered nodes in FIG. 3, namely nodes S, $N_1$, $N_2$, $N_3$, $N_4$, $N_5$ and D, are directly communicating nodes in the route, and unnumbered nodes, namely shadowed small circles in FIG. 3, are cooperative nodes.

After the route is set up, there is a set of segmenting modes $S=\{S_1, S_2, \ldots, S_m\}$ for the entire route, where each $S_i$ represents a segmenting mode.

A target function is a segmenting beneficial effect function of the segmenting mode. A larger function value indicates that the segmenting mode is more beneficial for performance improvement of a communication process.

For a certain selected segmenting mode $S_i$, a formula for calculating the target function $F_{S_i}$ is:

$$F_{S_i} = \frac{\gamma}{p_{S_i}} + (1-\gamma)C_{S_i},$$

where, $C_{S_i}$ is an end-to-end diversity gain corresponding to the segmenting mode $S_i$, $p_{S_i}$ is an end-to-end interrupt probability corresponding to the segmenting mode $S_i$, and $\gamma$ is a weighting factor.

A formula for calculating the interrupt probability $p_{S_i}$ is:

$$p_{S_i} = 1 - \prod_{j=1}^{x}(1-p_j)$$

where, $p_j$ is an interrupt probability of a $j^{th}$ one-hop link.

A formula for calculating the diversity gain, namely the diversity gain $C_{S_i}$ is:

$$C_{S_i} = \min_{j=1}^{x}\{C_j\}$$

where, $C_j$ is the diversity gain of the $j^{th}$ segment, x is the number of segments of $S_i$, and the corresponding $C_{S_i}$ is the minimum diversity gain of all segments in the entire path, which is also the minimum diversity gain of the link.

For the best segmenting mode S*, $$F^* = \max_{\{i\}}\{F_{S_i}\} = \max_{\{i\}}\left\{\frac{\gamma}{p_{S_i}} + (1-\gamma)C_{S_i}\right\}$$

where, F* is the maximum target function, which means when the maximum target function F* is obtained, the best segmenting mode S* is obtained.

When the established route is short, a direct method for determining the best segmenting mode of the route is to calculate target functions of all possible segmenting modes by using an enumeration method, and find the best segmenting mode by comparing the target functions.

Figure 4:
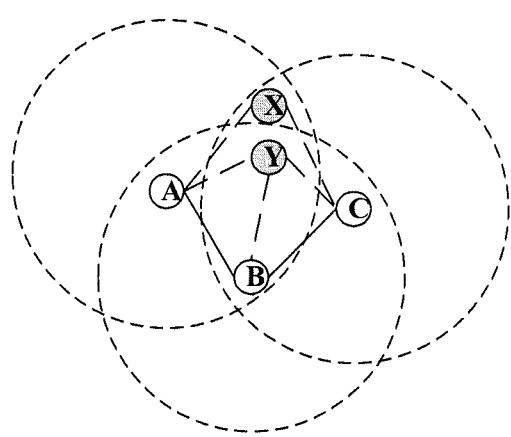
FIG. 4 is a schematic diagram of segmenting mode selection in the method for cooperative multi-hop routing in a wireless network according to an embodiment of the present invention.

As shown in FIG. 4, when it is determined that a route is A→B→C, and the maximum segment length is two hops, there are 6 possible segmenting modes in this example.

A first segmenting mode $S_1$: no cooperation.

A second segmenting mode $S_2$: one-hop segmenting, where AB uses no cooperation, and BC uses one cooperative node.

In the example, the one cooperative node may be a node Y or a node X. A cooperative node that enables a target function to be maximum is selected as a final cooperative node.

A third segmenting mode $S_3$: one-hop segmenting, where AB uses one cooperative node, and BC uses no cooperation.

In the example, the one cooperative node may be a node Y or a node X. A cooperative node that enables a target function to be maximum is selected as a final cooperative node.

A fourth segmenting mode $S_4$: one-hop segmenting, where AB uses one cooperative node, and BC uses one cooperative node.

In the example, the one cooperative node may be a node Y or a node X. A cooperative node that enables a target function to be maximum is selected as a final cooperative node.

A fifth segmenting mode $S_5$: two-hop segmenting, where AC uses one cooperative node.

In the example, the one cooperative node may be a node Y or a node X. A cooperative node that enables a target function to be maximum is selected as a final cooperative node.

A sixth segmenting mode $S_6$: two-hop segmenting, where AC uses two cooperative nodes.

In the example, the two cooperative nodes are a node X and a node Y.

For the first segmenting mode $S_1$, an end-to-end diversity gain, an interrupt probability, and a target function are calculated respectively as follows:

$$C_{S_1} = \min\{C_{AB}, C_{BC}\},$$
$$p_{S_1} = 1 - (1 - p_{AB})(1 - p_{BC}),$$
$$F_{S_1} = \frac{\gamma}{p_{S_1}} + (1-\gamma)C_{S_1};$$

where, $C_{AB}$ and $C_{BC}$ are obtained by using the calculation formula for the capacity in the one-hop direct link and no cooperation mode. $P_{AB}$ and $P_{BC}$ are obtained by using the calculation formula for the interrupt probability in the one-hop link and no cooperation mode.

For the second segmenting mode $S_2$ a formula for calculating the target function is $$F_{S_2} = \frac{\gamma}{p_{S_2}} + (1-\gamma)C_{S_2}.$$

When the cooperative node X is adopted for cooperative communication, an end-to-end diversity gain and an interrupt probability are respectively calculated as follows:

$C_{S_2}=\min\{C_{AB},C_{BXC}\},p_{S_2}=1-(1-p_{AB})\times\{1-[1-(1-p_{BX})(1-p_{XC})]\times p_{BC}\}.$ When the cooperative node Y is adopted for cooperative communication, an end-to-end diversity gain and an interrupt probability are respectively calculated as follows:

$C_{S_2}=\min\{C_{AB},C_{BYC}\},p_{S_2}=1-(1-p_{AB})\times\{1-[1-(1-p_{BY})(1-p_{YC})]\times p_{BC}\};$ where, $C_{BXC}$ and $C_{BYC}$ are obtained by using the calculation formula for the diversity gain in the foregoing one-hop direct link where one cooperative node is used, and $p_{BC}$ is obtained by using the calculation formula for the interrupt probability in the foregoing one-hop direct link where one cooperative node is used.

For the third segmenting mode $S_3$, a formula for calculating the target function is:

$$F_{S_3} = \frac{\gamma}{p_{S_3}} + (1-\gamma)C_{S_3}.$$

When the cooperative node X is adopted for cooperative communication, an end-to-end diversity gain and an interrupt probability are respectively calculated as follows:

$C_{S_3}=\min\{C_{AXB},C_{BC}\},p_{S_3}=1-\{1-[1-(1-p_{AX})(1-p_{XB})]\times p_{AB}\}\times(1-p_{BC}).$ When the cooperative node Y is adopted for cooperative communication, an end-to-end diversity gain and an interrupt probability are respectively calculated as follows:

$C_{S_3}=\min\{C_{AYB},C_{BC}\},p_{S_3}=1-\{1-[1-(1-p_{AY})(1-p_{YB})]\times p_{AB}\}\times(1-p_{BC});$ where, $C_{AXB}$ and $C_{AYB}$ are obtained by using the calculation formula for the diversity gain in the foregoing one-hop direct link where one cooperative node is used, and $p_{AB}$ is obtained by using the calculation formula for the interrupt probability in the foregoing one-hop direct link where one cooperative node is used.

For the fourth segmenting mode $S_4$, a formula for calculating the target function is:

$$F_{S_4} = \frac{\gamma}{p_{S_4}} + (1-\gamma)C_{S_4}.$$

When the cooperative node X is adopted for cooperative communication, an end-to-end diversity gain and an interrupt probability are respectively calculated as follows:

$C_{S_4}=\min\{C_{AXB},C_{BXC}\},p_{S_4}=1-\{1-[1-(1-p_{AX})(1-p_{XB})]\times p_{AB}\}\times\{1-[1-(1-p_{BX})(1-p_{XC})]\times p_{BC}\}.$ When the cooperative node Y is adopted for cooperative communication, an end-to-end diversity gain and an interrupt probability are respectively calculated as follows:

$C_{S_4}=\min\{C_{AYB},C_{BYC}\},p_{S_4}=1-\{1-[1-(1-p_{AY})(1-p_{YB})]\times p_{AB}\}\times\{1-[1-(1-p_{BY})(1-p_{YC})]\times p_{BC}\}.$ where, $C_{AXB}$, $C_{AYB}$, $C_{BXC}$, and $C_{BYC}$ are obtained by using the calculation formula for the diversity gain in the foregoing one-hop direct link where one cooperative node is used, and $p_{AB}$ and $p_{BC}$ are obtained by using the calculation formula for the interrupt probability in the foregoing one-hop direct link where one cooperative node is used.

For the fifth segmenting mode $S_5$, a formula for calculating the target function is:

$$F_{S_5} = \frac{\gamma}{p_{S_5}} + (1-\gamma)C_{S_5}.$$

When the cooperative node X is adopted for cooperative communication, an end-to-end diversity gain and an interrupt probability are respectively calculated as follows:

$C_{S_5}=C_{ABXC},p_{S_5}=1-[1-(1-p_{AX})(1-p_{XC})][1-(1-p_{AB})(1-p_{BC})].$

When the cooperative node Y is adopted for cooperative communication, an end-to-end diversity gain and an interrupt probability are respectively calculated as follows:

$C_{S_5}=C_{ABYC},p_{S_5}=1-[1-(1-p_{AY})(1-p_{YC})][1-(1-p_{AB})(1-p_{BC})];$ where, $C_{ABXC}$ and $C_{ABYC}$ are obtained by using the calculation formula for the diversity gain in the foregoing two-hop segmenting mode where one cooperative node is used, and $p_{AB}$ and $p_{BC}$ are obtained by using the calculation formula for the interrupt probability in the foregoing two-hop segmenting mode where one cooperative node is used.

For the sixth segmenting mode $S_6$, an end-to-end diversity gain, an interrupt probability, and a target function are calculated respectively as follows:

$$C_{S_6} = C_{ABXYC},$$

$$p_{S_6} = 1 - [1 - (1 - p_{AX})(1 - p_{XC})][1 - (1 - p_{AB})(1 - p_{BC})][$$
$$1 - (1 - p_{AY})(1 - p_{YC})],$$

$$F_{S_6} = \frac{\gamma}{p_{S_6}} + (1 - \gamma)C_{S_6}.$$

where, $C_{ABXYC}$ is obtained by using the calculation formula for the diversity gain in the foregoing two-hop segmenting mode where two cooperative nodes are used, and $p_{AB}$ and $p_{BC}$ are obtained by using the calculation formula for the interrupt probability in the foregoing two-hop segmenting mode where one cooperative node is used.

The maximum target function is found by comparing target functions in all the segmenting modes and between the segmenting modes. The segmenting mode and the cooperative node that correspond to the maximum target function are the best segmenting mode and cooperative node. Assuming that the maximum target function is obtained in the third segmenting mode where the cooperative node X is used, the third segmenting mode is the best segmenting mode, and the cooperative node X is the best cooperative node.

Then a source node A uses the best segmenting mode and the best cooperative node to send packet data to a destination node C. Thus, through cooperative multi-hop routing, the best performance of the communication process is achieved.

It may be known from the foregoing example that, implementation of the method is simple, the method is easier to implement when a network scale is small and a route is short, and the best performance in the entire network can be achieved.

When the network scale increases and the end-to-end path is longer, the number of segmenting modes grows exponentially, and the complexity of calculation also grows quickly. Therefore, a heuristic method is further provided here.

Figure 5:
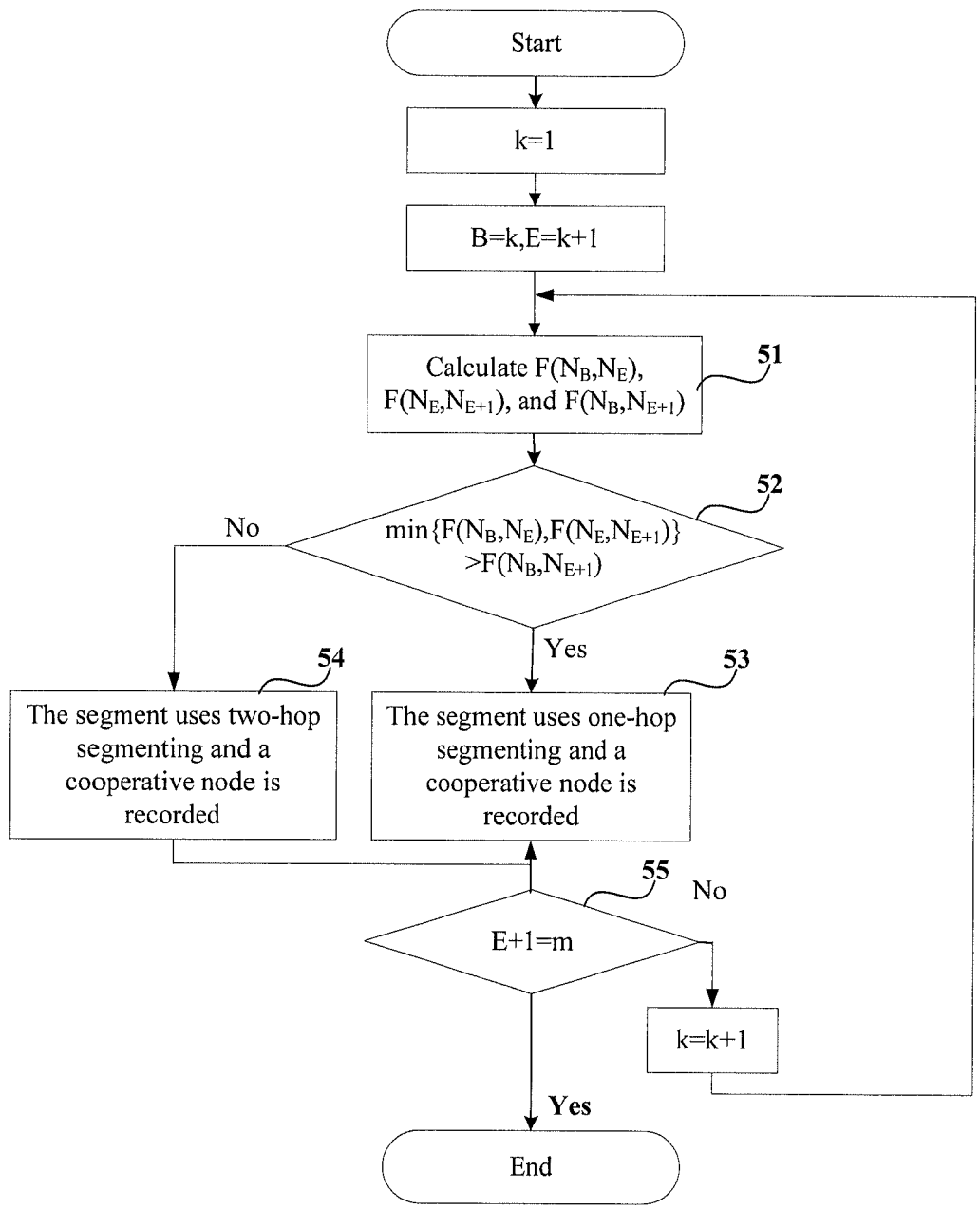
FIG. 5 is a flowchart of a heuristic method in the method for cooperative multi-hop routing in a wireless network according to an embodiment of the present invention.

A basic idea of the heuristic method is as follows: The best segmenting mode and the best cooperative node are determined section by section from a source node to a destination node with the constraint of two hops at most, namely, starting from the source node and taking two adjacent hops in the route as one section. Assuming that a source node is $N_1$, a destination node is $N_m$, and a route from the source node to the destination node is $P=\{N_1, N_2, N_3, \ldots, N_m\}$, the heuristic method from the source node to the destination node is as shown in FIG. 5. B, E, and k are variables, where E=k+1, and k is a natural number with an initial value 1. $N_B$ is used to represent a starting node of each section of route, $N_{E+1}$ is used to represent an ending node of each section of route, and $N_E$ is used to represent a middle master node of each section of route. A process for determining the best segmenting mode and the best cooperative node of each section of route includes:

Step 51: Find a common neighbor node of $N_B$ and $N_E$, calculate a diversity gain, an interrupt probability, and a target function from $N_B$ to $N_E$ under the cooperation of each common neighbor node.

Calculate capacity, an interrupt probability, and a target function from $N_B$ to $N_E$ when there is no cooperation.

Compare all target functions, and use the maximum target function as the target function $F_{N_B N_E}$ from $N_B$ to $N_E$.

Similarly, obtain the target function $F_{N_E N_{E+1}}$ from $N_E$ to $N_{E+1}$ through calculation.

Find a common neighbor node of $N_B$ and $N_{E+1}$, calculate a diversity gain, an interrupt probability, and a target function from $N_B$ to $N_{E+1}$ under the cooperation of each common neighbor node.

Calculate capacity, an interrupt probability, and a target function from $N_B$ to $N_{E+1}$ when there is no cooperation.

Compare all target functions from $N_B$ to $N_{E+1}$, and use the maximum target function as the target function $F_{N_B N_{E+1}}$ from $N_B$ to $N_{E+1}$.

A first section of route is taken as an example. $N_1$ is a starting node of a first segment, and $N_2$ is an ending node of the first segment; a cooperative node is searched according to neighbor nodes of $N_1$ and $N_2$, and the diversity gain $C_{N_1 N_2}$, interrupt probability $p_{N_1 N_2}$, and target function $F_{N_1 N_2}$ of the segment are calculated. $N_2$ is a starting node of a second segment, and $N_3$ is an ending node of the second segment; a cooperative node is searched according to neighbor nodes of $N_2$ and $N_3$, and the diversity gain $C_{N_2 N_3}$, interrupt probability $p_{N_2 N_3}$, and target function $F_{N_2 N_3}$ of the segment are calculated. $N_1$ is the starting node of the first segment, and $N_3$ is the ending node of the first segment; a cooperative node is searched according to neighbor nodes of $N_1$ and $N_3$, and the diversity gain $C_{N_1 N_3}$, interrupt probability $p_{N_1 N_3}$, and target function $F_{N_1 N_3}$ of the segment are calculated.

Step 52: Compare and $\min\{F_{N_B N_E}, F_{N_E N_{E+1}}\}$ and $F_{N_B N_{E+1}}$, and if $\min\{F_{N_B N_E}, F_{N_E N_{E+1}}\}$ is greater than $F_{N_B N_{E+1}}$, execute step 53; otherwise, execute step 54.

Step 53: Determine the section of route as one-hop segmenting, and record a corresponding cooperative node, so that subsequently, a source node can use one-hop segmenting and the recorded cooperative node to transmit packet data in the section of route. Then, execute step 55.

A segmenting mode of one-hop segmenting may be the foregoing first segmenting mode $S_1$ to the fourth segmenting mode $S_4$. That is, when there is no cooperation from $N_B$ to $N_{E+1}$, the segmenting mode of the section of route is $S_1$; when there is no cooperation from $N_B$ to $N_E$, and one cooperative node is used from $N_E$ to $N_{E+1}$, the segmenting mode of the section of route is $S_2$; when one cooperative node is used from $N_B$ to $N_E$, and there is no cooperation from $N_E$ to $N_{E+1}$, the segmenting mode of the section of route is $S_3$; when one cooperative node is used from $N_B$ to $N_E$, and one cooperative node is used from $N_E$ to $N_{E+1}$, the segmenting mode of the section of route is $S_4$.

When the segmenting mode is $S_2$, the recorded cooperative node is a cooperative node corresponding to the target function $F_{N_E N_{E+1}}$ from $N_E$ to $N_{E+1}$.

When the segmenting mode is $S_3$, the recorded cooperative node is a cooperative node corresponding to the target function $F_{N_B N_E}$ from $N_B$ to $N_E$.

When the segmenting mode is S4, the recorded cooperative nodes include a cooperative node corresponding to the target function $F_{N_B N_E}$ from $N_B$ to $N_E$, and a cooperative node corresponding to the target function $F_{N_E N_{E+1}}$ from $N_E$ to $N_{E+1}$.

Step 54: Determine that the section of route adopts two-hop segmenting, and record a corresponding cooperative node.

A segmenting mode corresponding to the two-hop segmenting may be the foregoing fifth segmenting mode $S_5$ and sixth segmenting mode $S_6$. When $N_B$ and $N_{E+1}$ use one cooperative node, the segmenting mode of the section of route is $S_s$; when $N_B$ and $N_{E+1}$ use two cooperative nodes, the segmenting mode of the section of route is $S_6$.

The recorded cooperative node is a cooperative node which is used by $N_B$ and $N_{E+1}$ and corresponds to the target function $F_{N_B N_{E+1}}$ from $N_B$ to $N_{E+1}$.

A first section of route is taken as an example. Compare $\min\{F_{N_1 N_2}, F_{N_2 N_3}\}$ and $F_{N_1 N_3}$, and if $\min\{F_{N_1 N_2}, F_{N_2 N_3}\}$ is greater than $F_{N_1 N_3}$, the first segment adopts one-hop segmenting; otherwise the first segment adopts two-hop segmenting.

Step 55: Judge whether E+1 is equal to m, namely, judge whether $N_{E+1}$ is a destination node. If yes, end the process. Otherwise, add 1 to k, and continue to execute step 51. That is, the ending node $N_{E+1}$ of the section of route is used as the starting node of the next section, and the segmenting mode and a cooperative node of the next section of route is determined in the same method. This process is repeated until the ending node of the section is the destination node.

The selection of cooperative nodes in a section of route is described through an example.

Figure 6:
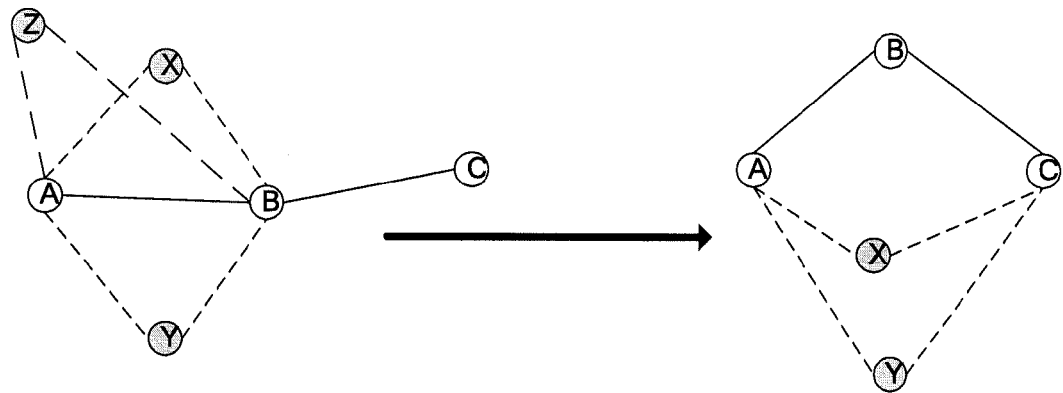
FIG. 6 is a schematic diagram of segmenting mode selection of a section of route in the heuristic method in the method for cooperative multi-hop routing in a wireless network according to an embodiment of the present invention.

As shown in FIG. 6, a node X, a node Y, and a node Z are cooperative nodes, and a node A, a node B, and a node C are master nodes.

Before a segmenting mode is determined, neighbor nodes that may be used for cooperation are determined first.

A target function when there is no cooperative node between the node A and the node B is calculated, and target functions when the node X, the node Y, and the node Z are respectively used as a cooperative node between the node A and the node B are calculated. Assuming that the target function when the node A and the node B use the node Y as the cooperative node is the greatest, the node Y is selected as the cooperative node between the node A and the node B; and the target function when the node A and the node B use the node Y as the cooperative node is used as the target function $F_{AB}$ between the node A and the node B.

Similarly, all possible target functions between the node B and the node C are calculated, and the greatest target function is found and used as the target function $F_{BC}$ between the node B and the node C. Assuming that the target function is the greatest when there is no cooperation, there is no cooperative node between the node B and the node C.

Then the target function of one-hop segmenting is $F_{AC}^1 = \min\{F_{AB}, F_{BC}\}$.

Target functions when the node A and the node C use one cooperative node or two cooperative nodes under two-hop segmenting are calculated. Assuming that the target function of the two-hop segment is the greatest when the node A and the node C use the node X and the node Y as cooperative nodes, the target function is used as the target function $F_{AC}^2$ of the two-hop segment.

Or, according to the description of the embodiment shown in FIG. 4, parameters $p_{AC}^2$, $C_{AC}^2$, $p_{AC}^1 = 1-(1-p_{AB})(1-p_{BC})$, and $C_{AC}^1 = \min\{C_{AB}, C_{BC}\}$ and are calculated to obtain $$F_{AC}^1 = \frac{\gamma}{p_{AC}^1} + (1-\gamma)C_{AC}^1$$

and $$F_{AC}^2 = \frac{\gamma}{p_{AC}^2} + (1-\gamma)C_{AC}^2.$$

If $F_{AC}^1 > F_{AC}^2$, as shown in FIG. 6, one-hop segmenting is selected for the section of route, and the cooperative node is the node Y. Otherwise, two-hop segmenting is used, and the cooperative nodes are the node X and the node Y.

Figure 7:
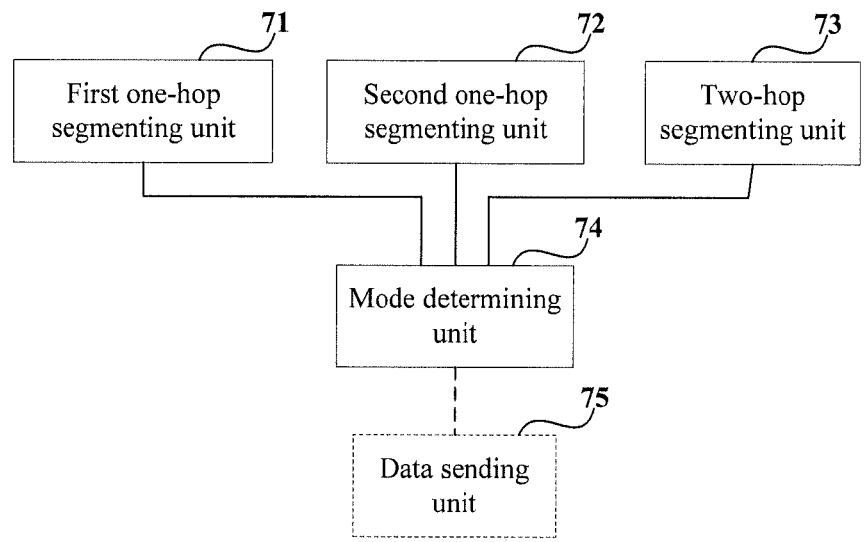
FIG. 7 is a schematic structural diagram of an apparatus for implementing cooperative multi-hop routing in a wireless network according to an embodiment of the present invention.

FIG. 7 is a schematic structural diagram of an apparatus for implementing cooperative multi-hop routing in a wireless network according to an embodiment of the present invention. As shown in FIG. 7, the apparatus includes: a first one-hop segmenting unit 71, a second one-hop segmenting unit 72, a two-hop segmenting unit 73, and a mode determining unit 74.

The first one-hop segmenting unit 71 is configured to, after a route is set up, use a common neighbor node of a first master node and a second master node that are in the route as a cooperative node, and obtain an end-to-end diversity gain and an interrupt probability between the first master node and the second master node when the cooperative node is in cooperation.

The second one-hop segmenting unit 72 is configured to use a common neighbor node of the second master node and a third master node that are in the route as a cooperative node, and obtain an end-to-end diversity gain and an interrupt probability between the second master node and the third master node when the cooperative node is in cooperation.

The two-hop segmenting unit 73 is configured to use a common neighbor node of the first master node and the third master node that are in the route as a cooperative node, and obtain an end-to-end diversity gain and an interrupt probability between the first master node and the third master node when the cooperative node is in cooperation. For example, the two-hop segmenting unit 73 may be specifically configured to obtain the end-to-end diversity gain between the first master node and the third master node through calculation by using a calculation formula:

$$C_{jAF} = \frac{W}{2}\log\left(1 + \frac{P_s|\alpha_{n_1 d}\beta_1 \alpha_{sn_1}|^2}{|\alpha_{n_1 d}\beta_1|^2 N_{n_1} + N_d} + \frac{P_s|\alpha_{rd}\beta_2 \alpha_{sr}|^2}{|\alpha_{rd}\beta_2|^2 N_r + N_d}\right)$$

or by using a calculation formula:

$$C_{jDF} = \frac{W}{2}\min\{\log(1 + SNR|\alpha_{sn_1}|^2 + SNR|\alpha_{sr}|^2), \log(1 + SNR|\alpha_{n_1 d}|^2 + SNR|\alpha_{rd}|^2)\}$$

or by using a calculation formula:

$$C_{jAF} = \frac{W}{3}\log\left(1 + \frac{P_s|a_{n_1 d}\beta_1 a_{sn_1}|^2}{|a_{n_1 d}\beta_1|^2 N_{n_1} + N_d} + \frac{P_s|a_{r_1 d}\beta_2 a_{sr_1}|^2}{|a_{r_1 d}\beta_2|^2 N_{r_1} + N_d} + \frac{P_s|a_{r_2 d}\beta_3 a_{sr_2}|^2}{|a_{r_2 d}\beta_3|^2 N_{r_2} + N_d}\right)$$

or by using a calculation formula:

$$C_{jDF} = \frac{W}{3}\min\left\{\begin{array}{l}\log(1 + SNR|\alpha_{sn_1}|^2 + SNR|\alpha_{sr_1}|^2 + SNR|\alpha_{sr_2}|^2),\\ \log(1 + SNR|\alpha_{n_1 d}|^2 + SNR|\alpha_{r_1 d}|^2 + SNR|\alpha_{r_2 d}|^2)\end{array}\right\};$$

where, $\alpha$ is a channel gain, SNR is a signal-to-noise ratio, P is transmit power, N is noise power, $\beta$ is a relay amplification coefficient, $$\beta \le \sqrt{\frac{P_r}{|a_{sr}|^2 P_s + N_r}},$$

the subscript s represents the first master node, the subscript d represents the third master node, $n_1$ represents a first cooperative node, and $n_2$ represents a second cooperative node.

The mode determining unit 74 is configured to determine a segmenting mode as one-hop segmenting with a corresponding cooperative node or two-hop segmenting with a corresponding cooperative node by using the obtained diversity gains and interrupt probabilities.

The apparatus for implementing cooperative multi-hop routing in a wireless network according to the embodiment may further include a data sending unit 75. The data sending unit 75 is configured to send packet data to a destination node in the determined segmenting mode.

The first one-hop segmenting unit 71 may be further configured to obtain end-to-end capacity and an interrupt probability between the first master node and the second master node when there is no cooperation.

The second one-hop segmenting unit 72 may be further configured to obtain end-to-end capacity and an interrupt probability between the second master node and the third master node when there is no cooperation.

The mode determining unit 74 may include:
- a first target function obtaining subunit, configured to obtain a target function in a first segmenting mode where the segmenting mode from the first master node to the third master node is one-hop segmenting by using the obtained end-to-end capacity and interrupt probability between the first master node and the second master node when there is no cooperation and by using the obtained end-to-end capacity and interrupt probability between the second master node and the third master node when there is no cooperation;
- a second target function obtaining subunit, configured to obtain a target function in a second segmenting mode where the segmenting mode from the first master node to the third master node is one-hop segmenting by using the obtained end-to-end capacity and interrupt probability between the first master node and the second master node when there is no cooperation and by using the obtained end-to-end diversity gain and interrupt probability between the second master node and the third master node when a cooperative node is in cooperation;
- a third target function obtaining subunit, configured to obtain a target function in a third segmenting mode where the segmenting mode from the first master node to the third master node is one-hop segmenting by using the obtained end-to-end diversity gain and interrupt probability between the first master node and the second master node when a cooperative node is in cooperation and by using the obtained end-to-end capacity and interrupt probability between the second master node and the third master node when there is no cooperation;
- a fourth target function obtaining subunit, configured to obtain a target function in a fourth segmenting mode where the segmenting mode from the first master node to the third master node is one-hop segmenting by using the obtained end-to-end diversity gain and interrupt probability between the first master node and the second master node when a cooperative node is in cooperation and by using the obtained end-to-end diversity gain and interrupt probability between the second master node and the third master node when a cooperative node is in cooperation;
- a two-hop segmenting target function obtaining subunit, configured to obtain a target function in the segmenting mode where the segmenting mode from the first master node to the third master node is two-hop segmenting by using the obtained end-to-end diversity gain and interrupt probability between the first master node and the third master node when a cooperative node is in cooperation; and
- a selecting subunit, configured to select the segmenting mode where the target function is the greatest.

Or, the mode determining unit 74 may include:
- a first target function obtaining subunit, configured to obtain an end-to-end target function between the first master node and the second master node by using the obtained end-to-end diversity gain and interrupt probability between the first master node and the second master node when a cooperative node is in cooperation;
- a second target function obtaining subunit, configured to obtain an end-to-end target function between the second master node and the third master node by using the obtained end-to-end diversity gain and interrupt probability between the second master node and the third master node when a cooperative node is in cooperation;
- a third target function obtaining subunit, configured to obtain an end-to-end target function between the first master node and the third master node by using the obtained end-to-end diversity gain and interrupt probability between the first master node and the third master node when a cooperative node is in cooperation;
- a comparing subunit, configured to compare the obtained target functions; and
- a determining subunit, configured to determine, according to a comparison result, that the segmenting mode between the first master node and the third master node is one-hop segmenting with a corresponding cooperative node or two-hop segmenting with a corresponding cooperative node.

The mode determining unit 74 may be specifically configured to obtain the target function by using a calculation formula:

$$F = \frac{\gamma}{p} + (1-\gamma)C$$

where F is the target function, p is the interrupt probability, and C is the diversity gain.

The apparatus for implementing cooperative multi-hop routing in a wireless network according to the embodiment of the present invention may further include: a sectioning unit and a judging unit.

The sectioning unit is configured to sequentially take two adjacent hops in the route as one section by using the first master node as a starting node; and the mode determining unit is specifically configured to determine a segmenting mode of each subsequent section of route according to the method for determining the segmenting mode from the first master node to the third master node.

The judging unit is configured to: after the mode determining unit determines the segmenting mode of each section of route, judge whether an ending node of the section of route is a destination node of the route; and if not, continue determining the segmenting mode of the subsequent adjacent section of route.

In the embodiment, the apparatus for implementing cooperative multi-hop routing in a wireless network obtains the diversity gains and the interrupt probabilities in a cooperative communication manner between master nodes in the route through the first one-hop segmenting unit, the second one-hop segmenting unit, and the two-hop segmenting unit, and determines the segmenting mode for sending packet data accordingly, thus implementing cooperative communication in a multi-hop route, where signals having the same information are sent through different paths, and multiple independently faded copies of data symbols may be obtained at a receiver end, thus obtaining better reception reliability and higher transmission capacity, and improving performance of a communication process.

Persons of ordinary skill in the art may understand that, all or part of the steps in the foregoing method embodiments may be implemented by a program instructing relevant hardware. The program may be stored in a computer readable storage medium. When the program is executed, the steps in the foregoing method embodiments are executed. The storage medium includes any medium that can store program codes, such as a ROM, a RAM, a magnetic disk, or a compact disk.

Finally, it should be noted that: the foregoing embodiments are merely used to describe rather than limit the technical solutions of the present invention; although the present invention is described in detail through the foregoing embodiments, persons of ordinary skill in the art should understand that: they may still make modifications to the technical solutions recorded in the foregoing embodiments, or make equivalent replacements to part of the technical features; however, these modifications or replacements do not make the nature of the corresponding technical solutions depart from the spirit and scope of the technical solutions in the embodiments of the present invention.

What is claimed is:

1. A method for cooperative multi-hop routing in a wireless network, comprising:

after a route is set up, using as a corresponding first cooperative node a common neighbor node of a first master node and a second master node that are in the route, and obtaining an end-to-end diversity gain and an interrupt probability between the first master node and the second master node when the first cooperative node is in cooperation with the first and second master nodes;

using as a corresponding second corresponding cooperative node a common neighbor node of the second master node and a third master node that are in the route, and obtaining an end-to-end diversity gain and an interrupt probability between the second master node and the third master node when the second cooperative node is in cooperation with the second and third mater nodes;

using as a corresponding third cooperative node a common neighbor node of the first master node and the third master node that are in the route, and obtaining an end-to-end diversity gain and an interrupt probability between the first master node and the third master node when the third cooperative node is in cooperation with the first and third master nodes; and determining a segmenting mode as a one-hop segmenting with a corresponding cooperative node or as a two-hop segmenting with a corresponding cooperative node, by obtaining a target function using the obtained diversity gains and interrupt probabilities from among the first, second and third master nodes.

2. The method for cooperative multi-hop routing in a wireless network according to claim 1, wherein, the method further comprises:

obtaining end-to-end capacity and an interrupt probability between the first master node and the second master node when there is no cooperation with the first cooperative node; and obtaining end-to-end capacity and interrupt probability between the second master node and the third master node when there is no cooperation with the second cooperative node; and the determining the segmenting mode as one-hop segmenting with a corresponding cooperative node or two-hop segmenting with a corresponding cooperative node by using the obtained diversity gains and interrupt probabilities comprises:

obtaining a target function in a first segmenting mode where a segmenting mode from the first master node to the third master node is one-hop segmenting by using the obtained end-to-end capacity and interrupt probability between the first master node and the second master node when there is no cooperation with the first cooperative node and by using the obtained end-to-end capacity and interrupt probability between the second master node and the third master node when there is no cooperation with the second cooperative node;

obtaining a target function in a second segmenting mode where the segmenting mode from the first master node to the third master node is one-hop segmenting by using the obtained end-to-end capacity and interrupt probability between the first master node and the second master node when there is no cooperation with the first cooperative node and by using the obtained end-to-end diversity gain and interrupt probability between the second master node and the third master node when the second cooperative node is in cooperation with the second corresponding cooperative node;

obtaining a target function in a third segmenting mode where the segmenting mode from the first master node to the third master node is one-hop segmenting by using the obtained end-to-end diversity gain and interrupt probability between the first master node and the second master node when the first cooperative node is in cooperation with the first and second master nodes and by using the obtained end-to-end capacity and interrupt probability between the second master node and the third master node when there is no cooperation with the second cooperative node;

obtaining a target function in a fourth segmenting mode where the segmenting mode from the first master node to the third master node is one-hop segmenting by using the obtained end-to-end diversity gain and interrupt probability between the first master node and the second master node when the first cooperative node is in cooperation with the first and second master nodes and by using the obtained end-to-end diversity gain and interrupt probability between the second master node and the third master node when the second cooperative node is in cooperation with the second and third master nodes;

obtaining a target function in a segmenting mode where the segmenting mode from the first master node to the third master node is two-hop segmenting by using the obtained end-to-end diversity gain and interrupt probability between the first master node and the third master node when the third cooperative node is in cooperation with the first and third master nodes; and selecting a segmenting mode where the target function is the greatest.

3. The method for cooperative multi-hop routing in a wireless network according to claim 1, wherein the determining the segmenting mode as one-hop segmenting with a corresponding cooperative node or two-hop segmenting with a corresponding cooperative node by using the obtained diversity gains and interrupt probabilities comprises:
   obtaining an end-to-end target function between the first master node and the second master node by using the obtained end-to-end diversity gain and interrupt probability between the first master node and the second master node when the first cooperative node is in cooperation with the first and second master nodes;
   obtaining an end-to-end target function between the second master node and the third master node by using the obtained end-to-end diversity gain and interrupt probability between the second master node and the third master node when the second cooperative node is in cooperation with the second and third master nodes;
   obtaining an end-to-end target function between the first master node and the third master node by using the obtained end-to-end diversity gain and interrupt probability between the first master node and the third master node when the third cooperative node is in cooperation with the first and third master nodes;
   comparing the obtained target functions; and
   determining, according to a comparison result, that the segmenting mode between the first master node and the third master node is one-hop segmenting with a corresponding cooperative node or two-hop segmenting with a corresponding cooperative node.

4. The method for cooperative multi-hop routing in a wireless network according to claim 3, further comprising:
   sequentially taking two adjacent hops in the route as one section by using the first master node as a starting node;
   determining a segmenting mode of each subsequent section of the route in turn according to the determining of the segmenting mode from the first master node to the third master node; and
   after determining the segmenting mode of each section of route, judging whether an ending node of the section of route is a destination node of the route; and if not, continuing determining a segmenting mode of a subsequent adjacent section of route.

5. The method for cooperative multi-hop routing in a wireless network according claim 1, wherein the obtaining the end-to-end diversity gain between the first master node and the third master node when the third cooperative node is in cooperation with the first and third master nodes comprises:
   obtaining the end-to-end diversity gain between the first master node and the third master node in case of an amplify-and-forward (AF) mode through calculation by using a calculation formula:

$$C_{jAF} = \frac{W}{2}\log\left(1 + \frac{P_s|\alpha_{n_1d}\beta_1\alpha_{sn_1}|^2}{|\alpha_{n_1d}\beta_1|^2 N_{n_1} + N_d} + \frac{P_s|\alpha_{rd}\beta_2\alpha_{sr}|^2}{|\alpha_{rd}\beta_2|^2 N_r + N_d}\right)$$

or in case of a decode-and-forward (DF) mode by using a calculation formula:

$$C_{jDF} = \frac{W}{2}\min\left\{\begin{array}{l}\log(1 + SNR|\alpha_{sn_1}|^2 + SNR|\alpha_{sr}|^2), \\ \log(1 + SNR|\alpha_{n_1d}|^2 + SNR|\alpha_{rd}|^2)\end{array}\right\}$$

or in case of AF mode by using a calculation formula:

$$C_{jAF} = \frac{W}{3}\log\left(\begin{array}{l}1 + \frac{P_s|\alpha_{n_1d}\beta_1\alpha_{sn_1}|^2}{|\alpha_{n_1d}\beta_1|^2 N_{n_1} + N_d} + \\ \frac{P_s|\alpha_{r_1d}\beta_2\alpha_{sr_1}|^2}{|\alpha_{r_1d}\beta_2|^2 N_{r_1} + N_d} + \frac{P_s|\alpha_{r_2d}\beta_3\alpha_{sr_2}|^2}{|\alpha_{r_2d}\beta_3|^2 N_{r_2} + N_d}\end{array}\right)$$

or in case of DF mode by using a calculation formula:

$$C_{jDF} = \frac{W}{3}\min\left\{\begin{array}{l}\log(1 + SNR|\alpha_{sn_1}|^2 + SNR|\alpha_{sr_1}|^2 + SNR|\alpha_{sr_2}|^2), \\ \log(1 + SNR|\alpha_{n_1d}|^2 + SNR|\alpha_{r_1d}|^2 + SNR|\alpha_{r_2d}|^2)\end{array}\right\};$$

where, W is a channel bandwidth, $\alpha$ is a channel gain, SNR is a signal-to-noise ratio, P is transmit power, N is noise power, $\beta$ is a relay amplification coefficient, $$\beta \leq \sqrt{\frac{P_r}{|\alpha_{sr}|^2 P_s + N_r}},$$

subscript s represents the first master node, subscript d represents the third master node, $n_1$ represents a first cooperative node, and $n_2$ represents a second cooperative node.

6. The method for cooperative multi-hop routing in a wireless network according to claim 2, wherein a formula for calculating the target function is:

$$F = \frac{\gamma}{p} + (1-\gamma)C,$$

where, F is a target function, $\gamma$ is a weighting factor, p is an interrupt probability, and C is a diversity gain.

7. The method for cooperative multi-hop routing in a wireless network according to claim 1, wherein, after the determining the segmenting mode as one-hop segmenting with a corresponding cooperative node or two-hop segmenting with a corresponding cooperative node by using the obtained diversity gains and interrupt probabilities, the method further comprises:
   sending, by the first master node, packet data to a destination node in the determined segmenting mode.

8. An apparatus for implementing cooperative multi-hop routing in a wireless network, comprising:
   computer hardware configured to execute:
      after a route is set up, use as a corresponding first cooperative node a common neighbor node of a first master node and a second master node that are in the route, and obtain an end-to-end diversity gain and an interrupt probability between the first master node and the second master node when the first cooperative node is in cooperation with the first and second master nodes;
      use as a corresponding second corresponding cooperative node a common neighbor node of the second master node and a third master node that are in the route, and obtain an end-to-end diversity gain and an interrupt probability between the second master node and the third master node when the second cooperative node is in cooperation with the second and third master nodes;

use as a corresponding third cooperative node a common neighbor node of the first master node and the third master node that are in the route, and obtain an end-to-end diversity gain and an interrupt probability between the first master node and the third master node when the third cooperative node is in cooperation with the first and third master nodes; and determine a segmenting mode as a one-hop segmenting with a corresponding cooperative node or as two-hop segmenting with a corresponding cooperative node, by obtaining a target function using the obtained diversity gains and interrupt probabilities from among the first, second and third master nodes.

9. The apparatus according to claim 8, wherein the computer hardware is further configured to execute:

obtain end-to-end capacity and an interrupt probability between the first master node and the second master node when there is no cooperation with the first cooperative node;

obtain end-to-end capacity and an interrupt probability between the second master node and the third master node when there is no cooperation with the second cooperative node; and obtain a target function in a first segmenting mode where a segmenting mode from the first master node to the third master node is one-hop segmenting by using the obtained end-to-end capacity and interrupt probability between the first master node and the second master node when there is no cooperation with the first cooperative node and by using the obtained end-to-end capacity and interrupt probability between the second master node and the third master node when there is no cooperation with the second cooperative node;

obtain a target function in a second segmenting mode where the segmenting mode from the first master node to the third master node is one-hop segmenting by using the obtained end-to-end capacity and interrupt probability between the first master node and the second master node when there is no cooperation with the first cooperative node and by using the obtained end-to-end diversity gain and interrupt probability between the second master node and the third master node when the second cooperative node is in cooperation with the second cooperative node;

obtain a target function in a third segmenting mode where the segmenting mode from the first master node to the third master node is one-hop segmenting by using the obtained end-to-end diversity gain and interrupt probability between the first master node and the second master node when the first cooperative node is in cooperation with the first and second master nodes and by using the obtained end-to-end capacity and interrupt probability between the second master node and the third master node when there is no cooperation with the second cooperative node;

obtain a target function in a fourth segmenting mode where the segmenting mode from the first master node to the third master node is one-hop segmenting by using the obtained end-to-end diversity gain and interrupt probability between the first master node and the second master node when the first cooperative node is in cooperation with the first and second master nodes and by using the obtained end-to-end diversity gain and interrupt probability between the second master node and the third master node when the second cooperative node is in cooperation with the second and third master nodes;

obtain a target function in a segmenting mode where the segmenting mode from the first master node to the third master node is two-hop segmenting by using the obtained end-to-end diversity gain and interrupt probability between the first master node and the third master node when the third cooperative node is in cooperation with the first and second master nodes; and select a segmenting mode where the target function is the greatest.

10. The apparatus according to claim 8, wherein the computer hardware is further configured to execute:

obtain an end-to-end target function between the first master node and the second master node by using the obtained end-to-end diversity gain and interrupt probability between the first master node and the second master node when the first cooperative node is in cooperation with the first and second master nodes;

obtain an end-to-end target function between the second master node and the third master node by using the obtained end-to-end diversity gain and interrupt probability between the second master node and the third master node when the second cooperative node is in cooperation with the second and third master nodes;

a third target function obtaining subunit, configured to obtain an end-to-end target function between the first master node and the third master node by using the obtained end-to-end diversity gain and interrupt probability between the first master node and the third master node when the third cooperative node is in cooperation with the first and third master nodes;

compare the obtained target functions; and determine, according to a comparison result, that the segmenting mode between the first master node and the third master node is one-hop segmenting with a corresponding cooperative node or two-hop segmenting with a corresponding cooperative node.

11. The apparatus according to claim 10, wherein the computer hardware is further configured to execute:

sequentially take two adjacent hops in the route as one section by using the first master node as a starting node;

determine a segmenting mode of each subsequent section of the route in turn according to the determining of the segmenting mode from the first master node to the third master node; and of the segmenting mode of each section of route, judge whether an ending node of the section of route is a destination node of the route; and if not, continue determining a segmenting mode of the subsequent adjacent section of route.

12. The apparatus according to claim 8, wherein the computer hardware is further configured to obtain the end-to-end diversity gain between the first master node and the third master node in case of an amplify-and-forward (AF) mode through calculation by using a calculation formula:

$$C_{jAF} = \frac{W}{2}\log\left(1 + \frac{P_s|\alpha_{n_1d}\beta_1\alpha_{sn_1}|^2}{|\alpha_{n_1d}\beta_1|^2 N_{n_1} + N_d} + \frac{P_s|\alpha_{rd}\beta_2\alpha_{sr}|^2}{|\alpha_{rd}\beta_2|^2 N_r + N_d}\right)$$

or in case of a decode-and-forward (DF) mode by using a calculation formula:

$$C_{jDF} = \frac{W}{2}\min\left\{\begin{array}{l} \log(1 + SNR|\alpha_{sn_1}|^2 + SNR|\alpha_{sr}|^2), \\ \log(1 + SNR|\alpha_{n_1d}|^2 + SNR|\alpha_{rd}|^2) \end{array}\right\}$$

or in case of AF mode by using a calculation formula:

$$C_{jAF} = \frac{W}{3}\log\left(\begin{array}{l} 1 + \frac{P_s|a_{n_1d}\beta_1 a_{sn_1}|^2}{|a_{n_1d}\beta_1|^2 + N_{n_1} + N_d} + \\ \frac{P_s|a_{r_1d}\beta_2 a_{sr_1}|^2}{|a_{r_1d}\beta_2|^2 + N_{r_1} + N_d} + \frac{P_s|a_{r_2d}\beta_3 a_{sr_2}|^2}{|a_{r_2d}\beta_3|^2 N_{r_2} + N_d} \end{array}\right)$$

or in case of DF mode by using a calculation formula:

$$C_{jDF} = \frac{W}{3}\min\left\{\begin{array}{l} \log(1 + SNR|\alpha_{sn_1}|^2 + SNR|\alpha_{sr_1}|^2 + SNR|\alpha_{sr_2}|^2), \\ \log(1 + SNR|\alpha_{n_1d}|^2 + SNR|\alpha_{r_1d}|^2 + SNR|\alpha_{r_2d}|^2) \end{array}\right\};$$

where, W is a channel bandwidth, α is a channel gain, SNR is a signal-to-noise ratio, P is transmit power, N is noise power, β is a relay amplification coefficient, $$\beta \leq \sqrt{\frac{P_r}{|a_{sr}|^2 P_s + N_r}},$$

subscript s represents the first master node, subscript d represents the third master node, $n_1$ represents a first cooperative node, and $n_2$ represents a second cooperative node.

13. The apparatus according to claim 9, wherein the computer hardware is further configured to execute: obtain the target function by using a calculation formula:

$$F = \frac{\gamma}{p} + (1-\gamma)C$$

where F is a target function, γ is a weighting factor, p is an interrupt probability, and C is a diversity gain.

14. The apparatus according to claim 8, wherein the computer hardware is further configured to execute:
send packet data to a destination node in the determined segmenting mode.

* * * * *

UNITED STATES PATENT AND TRADEMARK OFFICE
CERTIFICATE OF CORRECTION

PATENT NO. : 8,416,682 B2
APPLICATION NO. : 13/472779
DATED : April 9, 2013
INVENTOR(S) : Li et al.

It is certified that error appears in the above-identified patent and that said Letters Patent is hereby corrected as shown below:

In the Claims

Column 19, Line 51, in Claim 1, delete "mater" and insert -- master --, therefor.
Column 24, Line 49, in Claim 11, before "of the segmenting mode" insert -- after the determining --, therefor.

Signed and Sealed this
Twenty-second Day of July, 2014

Michelle K. Lee
*Deputy Director of the United States Patent and Trademark Office*